United States Patent [19]

Faure et al.

[11] 4,317,666
[45] Mar. 2, 1982

[54] PROCESS AND APPARATUS FOR CONTROLLING THE DRAWING OF AN OPTICAL FIBRE FROM A GLASS PREFORM

[75] Inventors: Michel Faure; Yves Lumineau, both of Paris, France

[73] Assignee: Thomson-CSF, Paris, France

[21] Appl. No.: 183,649

[22] Filed: Sep. 3, 1980

[30] Foreign Application Priority Data

Sep. 6, 1979 [FR] France ................ 79 22299

[51] Int. Cl.³ .............. C03B 37/025; C03B 37/07
[52] U.S. Cl. ........................... 65/2; 65/13; 65/29; 65/158; 65/162; 65/11.1
[58] Field of Search ............ 65/2, 3.11, 11.1, 13, 65/29, 162, 164, 158

[56] References Cited

U.S. PATENT DOCUMENTS 3,471,278  10/1969  Griem, Jr. ..................... 65/2
4,123,242  10/1978  Imoto et al. ................. 65/29 X

FOREIGN PATENT DOCUMENTS 2383137  10/1978  France .

*Primary Examiner*—Richard V. Fisher
*Attorney, Agent, or Firm*—Oblon, Fisher, Spivak, McClelland & Maier

[57] ABSTRACT

In the drawing of an optical fibre from a glass preform or gathering mould maintained at an appropriate temperature, a process and a system is described for controlling and regulating the characteristics of the optical fibre. To this purpose the fibre formation temperature within the drawing furnace is controlled by a measurement of the tensile stress. The heating of the furnace is regulated, while maintaining constant the tensile stress on the glass fibre at the fibre formation point. A gauge with an electronic measuring bridge is used to carry out a measurement at the preform suspension point, while correcting the effect of the weight reduction of the preform during drawing.

3 Claims, 2 Drawing Figures

PROCESS AND APPARATUS FOR CONTROLLING THE DRAWING OF AN OPTICAL FIBRE FROM A GLASS PREFORM

BACKGROUND OF THE INVENTION

The present invention relates to the drawing of a glass fibre, to be used as an optical wave guide, from a glass preform or gathering mould. Its object is to control and regulate the characteristics of the optical fibre.

It is known that it is necessary to master a certain number of parameters in order to produce a glass fibre which is able to serve as a light wave guide having constant optical transmission characteristics. The main parameters of the fibre formation operation, i.e. the drawing from a glass preform or gathering mould with a diameter much greater than that of the fibre are as follows:
- the diameter of the preform, which must be as uniform as possible over the useful length thereof,
- the fibre diameter, which is linked with the drawing rate and which can easily be controlled during drawing, and
- the temperature of the fibre formation cone, i.e. the end of the preform from which the fibre emerges, said temperature determining the viscosity of the glass and by combination with the drawing rate the diameter of the fibre and that of the preform also determines the tensile stress.

However, said temperature is difficult to control in a precise manner. In the conventional fibre formation process the measurement of the temperature of the fibre formation cone within the furnace or oven is performed by means of an optical pyrometer by sighting through a window made in the furnace. Although the pyrometer may be accurate, the sighting or inspection window introduces a double source of error, because it firstly creates an asymmetry of the temperature gradient in the furnace and secondly a critical passage point for the light flux to be measured due to the frequent condensation of material on the transparent wall and the darkening which results therefrom.

BRIEF SUMMARY OF THE INVENTION

The invention utilizes the close dependence between the temperature of the fibre formation cone and the tensile stress on the fibre for a given extraction speed. According to the invention the control is carried out by regulating the heating of the fibre formation furnace in such a way as to keep constant the tensile stress exerted on the glass fibre at the fibre formation point by permanently controlling the tensile stress exerted upstream of the fibre formation cone on the glass preform. The tensile stress is measured at the suspension point of the glass preform and means are provided for compensating the error resulting from the reduction in the weight of the preform during drawing.

Positioning upstream of the fibre formation cone prevents an error from which a downstream measurement would suffer, for example level with the fibre drawing capstan due to the friction created by the coating or covering of the fibre with a mechanical protection material and effected immediately on leaving the furnace in most drawing installations.

The error due to the reduction in the weight of the preform during drawing is compensated by making the mechanism for lowering the preform into the fibre formation furnace act on a device for the automatic compensation of this error.

The invention therefore relates to a process for controlling the drawing of an optical fibre from a glass preform or gathering mould introduced into a fibre formation furnace, wherein heating and consequently the temperature of the preform at the fibre formation point is regulated by maintaining constant the tensile stress on the glass fibre at said fibre formation point, the tensile stress being measured at the point of suspension of the preform and means for compensating the effect on the result of the measurement of the reduction in the preform weight are inserted in the preform lowering mechanism.

BRIEF DESCRIPTION OF THE DRAWINGS

The invention is described in greater detail hereinafter relative to non-limitative embodiments and with reference to the drawings, wherein show.

DETAILED DESCRIPTION OF THE PREFERRED EMBODIMENTS

Figure 1:
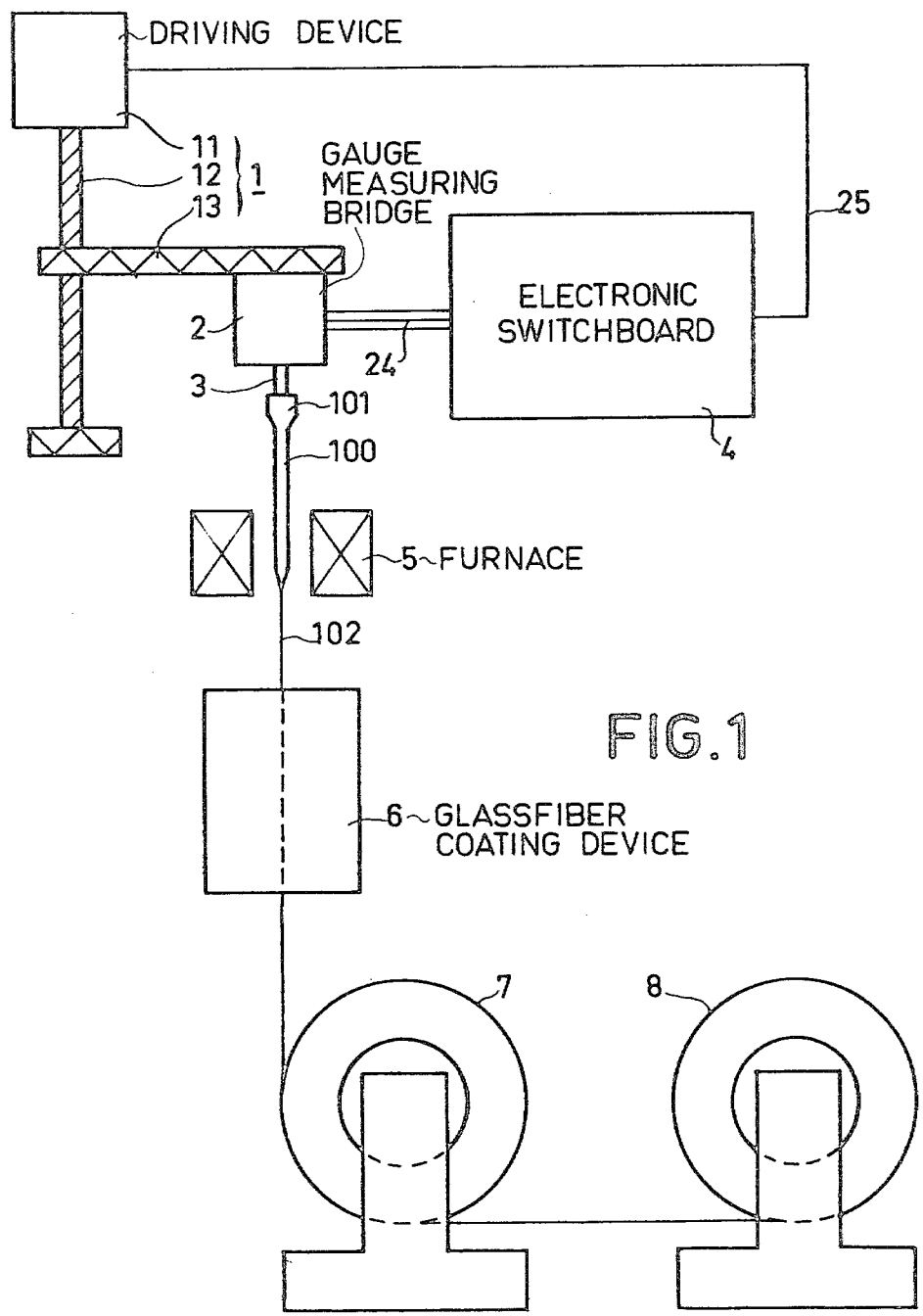
FIG. 1, a drawing frame using the process of the invention.

In an exemplified manner the drawing installation of FIG. 1 comprises:
- a mechanism 1 for lowering the preform 100 where there is a driving device 11 with a vertical axis rotating a threaded mandrel 12 which traverses a support 13 via a tapped hole;
- a gauge 2 of the variable resistance type with an impedence measuring bridge fixed to support 13 and a draw rod 3 connected to preform 100 by end 101 of the latter;
- an electronic switchboard 4 connected by cables 24 and 25 to gauge 2 and to the driving device 11;
- a fibre formation furnace 5 into which passes preform 100 and from which emerges glass fibre 102 drawn from preform 100;
- a glass fibre coating device 6 comprising in per se known manner a coating system (not shown in detailed manner) using a semi-liquid polymerizable product, as well as a coating baking oven (not shown in detailed manner);
- a drive system 7 using a capstan and electric motor; and
- a storage system 8 incorporating a drum and a drive motor synchronized with the other motor.

The operation of the installation differs from that of a conventional installation due to the following points:
- the absence of the temperature measurement of the fibre formation cone;
- the measurement of the tensile stress (by gauge and associated electronics), whilst eliminating the error factor constituted by the variation in the weight of the preform during drawing—thus, the stress measured level with the gauge is the sum of the glass weight suspended on 3 and the tensile stress exerted on fibre 102 level with the fibre formation cone and hereinafter reference will be made to "corrected stress" as the result obtained after eliminating the glass weight; and
- the regulation of the heating of furnace 5 on the basis of the corrected stress value, whereby optionally the regulation is carried out by a control device controlled by an error signal based on a "corrected stress" signal (not shown conventional system) instead of by a supervisory operator.

The gauge and the electronic part of the installation connected thereto are designed so as to solve the problem of the correction of the approximate value F of the tensile stress during drawing to obtain the corrected stress value f.

A simple calculation shows that the equilibrium equation during drawing level with the fixing point of the preform beneath the gauge is as follows:

$$F = P_o \frac{L}{L_o} + f \qquad (1)$$

in which:
F = approximate tensile stress;
$P_o$ = initial weight of the preform;
$L_o$ = initial length of the preform;
L = length of the preform at the time of measurement during drawing; and
f = corrected stress.

Figure 2:
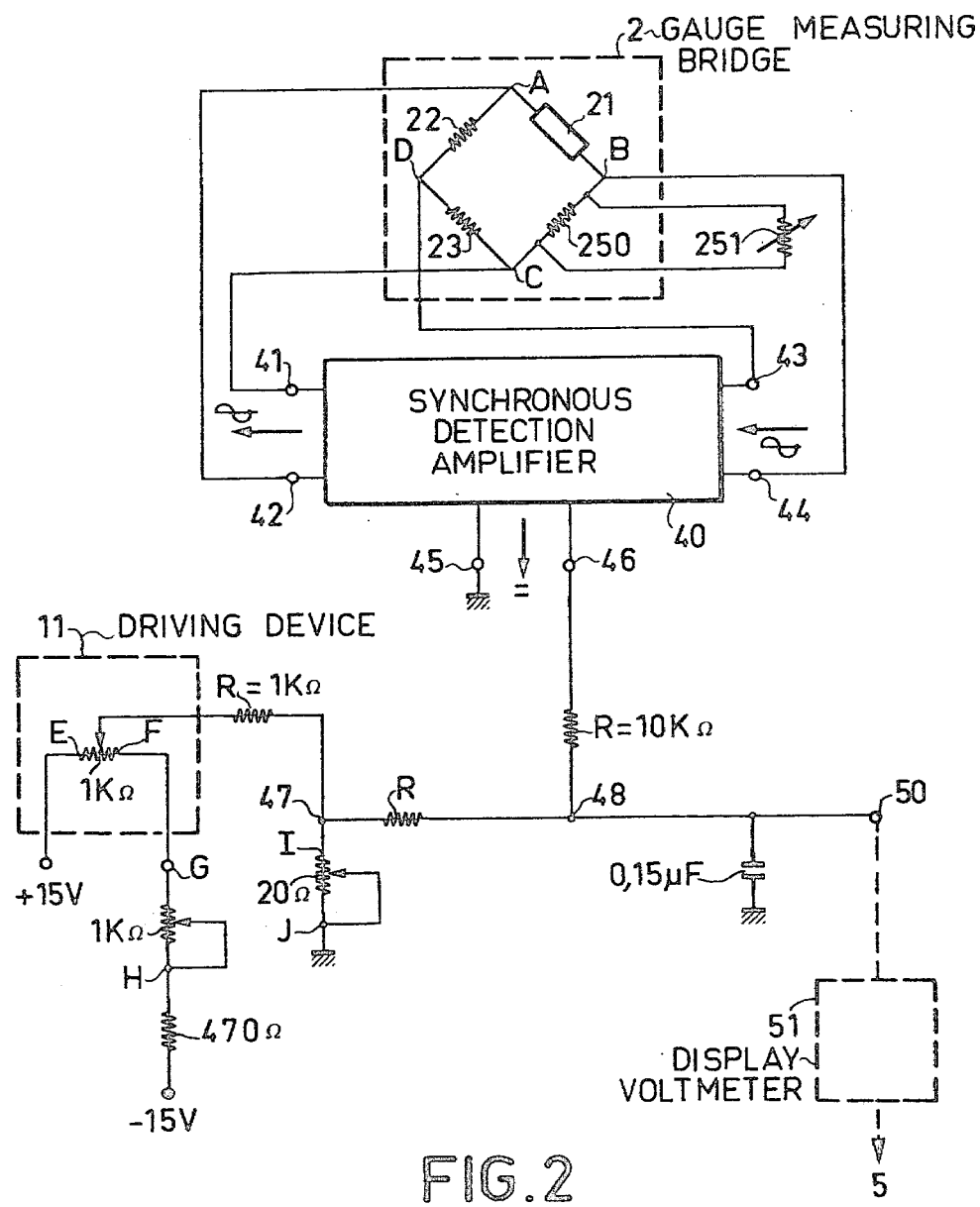
FIG. 2, in detailed manner, the electronic means used in the frame of FIG. 1.

FIG. 2 shows the electronics of the installation, including the electrical means forming part of gauge 2.

Gauge 2 contains a measuring bridge ABCD incorporating, for example, in branch AB a resistor 21 of the type conventionally used in such gauges and with fixed resistors 22 and 23 in branches AD and DC. Branch BC contains an internal fixed resistor 250 on the one hand and on the other hand in parallel therewith a variable resistor 251 located outside the gauge in the electronic switchboard 4. This variable resistor is used for resetting the measuring bridge.

The electronic switchboard 4 contains a conventional synchronous detection amplifier 40 which has, in addition to an internal generator for a measuring signal of given frequency (e.g. 1 kHz sinusoidal signal) an internal control system in phase with the signal transmitted by the generator and the signal received at the input of the amplifier (not shown in detailed manner). Such a phase control system makes it possible to eliminate possible errors which could be imputed to noise of an electrical type, particularly at 50 Hz.

Terminals 41 and 42 represent the output of the signal transmitted by the internal generator (not shown in detailed manner) of apparatus 40. Terminals 43 and 44 represent the input of the signal to be measured and terminals 45 and 46 the output of the amplified signal. As shown in FIG. 22 terminals 41 and 42 are connected to points A and C of a first diagonal of the measuring bridge and terminals 43 and 44 are connected at points B and D of the second diagonal of the bridge.

On the output side of the signal to be used in the invention as terminal 45 is, for example, at earth terminal 46 is connected by two series resistors R (10 kohms) to point 47 of a potentiometric divider having two parallel regulating paths between point 47 and earth.

The first regulating path has a potentiometer EF (1 KΩ) energized with +15 V at E and in series a potentiometric resistor GH (max 1 KΩ) and a 470Ω resistor connected to −15 V. The output signal is obtained at the centre of potentiometer EF through a fixed 1 K Ω resistor.

The potentiometer EF has the special feature of being placed in the driving device 11 of the preform lowering device and is automatically operated by this device so as to make the corresponding correction to equation 1. Potentiometer GH regulates the zero of the first regulating path.

The second manual regulating path has a potentiometric resistor IJ (max. 20 ohms) and permits adjustment as a function of the preform diameter.

The intermediate point 48 located between the two resistor paths connected to the output terminal 15 of the corrected stress signal, said terminal being disconnected from earth in alternating current by a capacitance of 0.15 microfarads.

51 is a display voltmeter for the useful signal observed by the operator responsible for manually regulating the fibre formation furnace.

Manual regulation can be replaced by an automatic control system and in this case device 51 should represent such a system and the corresponding arrow 5 would be the connection of said system to the fibre formation furnace.

What is claimed is:

1. A process for controlling the drawing of an optical fibre from a glass preform or gathering mould introduced into a fibre formation furnace, comprising the steps of:
regulating the heating and consequently the temperature of the preform at the fiber formation point by maintaining constant the tensile stress of the glass fibre at said fibre formation point, the tensile stress being measured at the point of suspension of the preform; and,
compensating the effect on the result of the measurement of the reduction in the preform weight at the point where the preform is lowered.

2. An apparatus for controlling the drawing of an optical fibre from a glass preform or gathering mould introduced into a fibre formation furnace, comprising:
tensile stress measurement means including a gauge inserted at a preform suspension point;
compensation means including a potentiometric device operated by a preform lowering mechanism for compensating the effect on the result of the measurement in the preform weight at the point where the preform is lowered; synchronous detector amplifier means associated with a measuring brige where said gauge is inserted and a system of potentiometers located at the output of said synchronous detector amplifier and further including a regulating path in which is inserted said potentiometric device operated by said preform lowering mechanism and an output terminal supplying a signal measuring the tensile stress on the glass fibre in the fibre formation furnace.

3. The apparatus of claim 2 further comprising a heater controlling means for controlling the heat of the fibre formation furnace on the basis of said signal measuring the tensile stress on the glass fibre in the fibre formation furnace.

* * * * *

UNITED STATES PATENT AND TRADEMARK OFFICE
CERTIFICATE OF CORRECTION

PATENT NO. : 4,317,666
DATED : Mar. 2, 1982
INVENTOR(S) : Michel Faure, et. al.

It is certified that error appears in the above—identified patent and that said Letters Patent is hereby corrected as shown below:

Please correct the Inventors Information to read as follows:

[75]---Inventors:  Michel Faure; Yves Lumineau;

Jacques Dubos, all of Paris,

France

Signed and Sealed this

Fourth Day of May 1982

[SEAL]

Attest:

GERALD J. MOSSINGHOFF

*Attesting Officer*   *Commissioner of Patents and Trademarks*